April 29, 1947.  S. M. COOPER  2,419,885
BEARING SEAL
Filed Jan. 5, 1939
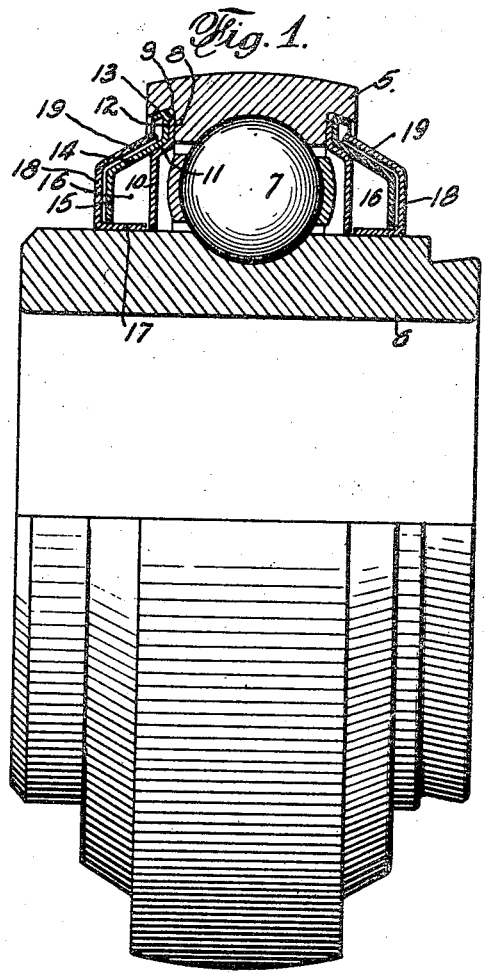
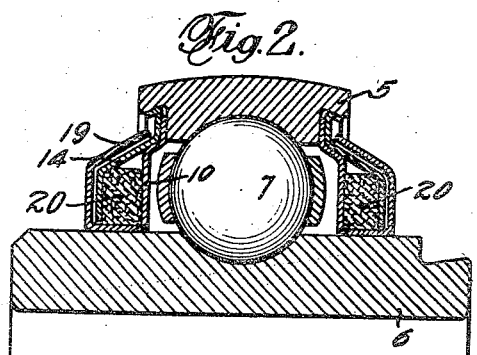
INVENTOR
STANLEY M. COOPER
BY
Mitchell Bechert
ATTORNEYS Patented Apr. 29, 1947

2,419,885

UNITED STATES PATENT OFFICE 2,419,885

BEARING SEAL

Stanley M. Cooper, New Britain, Conn., assignor to The Fafnir Bearing Company, New Britain, Conn., a corporation of Connecticut Application January 5, 1939, Serial No. 249,396

4 Claims. (Cl. 286—5)

My invention relates to a bearing seal.

It is an object of the invention to provide an improved form of seal, which is simple in construction and effective in retaining lubricant in and excluding foreign matter from a bearing.

Other objects and various features of novelty and invention will be hereinafter pointed out or will become apparent to those skilled in the art.

In the drawings which show, for illustrative purposes only, preferred forms of the invention—

Fig. 1 is an edge view in quarter section of a bearing, illustrating one form of my improved seal;

Fig. 2 is a fragmentary view similar to Fig. 1, illustrating a modified form of seal.

The bearing illustrated includes an outer bearing ring 5, an inner bearing ring 6, with interposed anti-friction bearing members such as balls 7. The bearing rings have raceways for receiving the balls 7 which hold the two rings in unit handling relationship. The outer bearing ring has a spherical outer surface for reception in a housing of similar form to provide for shaft misalignment, as will be understood. The bearing illustrated is of the so-called long inner ring type, wherein the inner ring 6 is longer than the outer ring and has an extended longitudinal bearing surface on the shaft to be received in the bore of the inner ring.

My improved seal includes cooperating seal members of sheet metal or the like carried by the inner and outer bearing rings and so arranged as to provide an effective seal against loss of lubricant and against the ingress of foreign matter to the bearing. In the form illustrated, the outer ring 5 at the edge is provided with a counterbore 8 and undercut groove 9. A seal part of generally channel form is secured to the outer ring and in the form illustrated a seal plate or retainer of generally disk form 10 fits in the counterbore and abuts the bottom thereof, as will be clear. The outer edge of the disk 10 may be offset slightly, as indicated at 11, so as to provide ample clearance in the bearing. The disk 10 as illustrated is inside of the plane of the edge of the outer ring, though it may be otherwise arranged. A second seal plate or sealing ring 12 abuts the outer portion of the first seal disk 10 and the outer edge of the disk 12 is crimped into the undercut groove 9 as is indicated at 13, so that both plates 10—12 will be securely held on the outer ring and form a relatively tight joint. The seal plate 12 is of generally angular cross-section and includes a flared flange portion 14 which extends generally radially inwardly and longitudinally outwardly of the bearing and another flange part 15 which may extend generally radially inwardly. The parts 19—15 are spaced apart so as to constitute a channel and provide a space 16 between them.

The inner ring carries a combined seal and flinger member and in the form shown includes a sleeve 17 pressed or secured on the outer surface of the inner ring. The inner end of the sleeve 17 extends into sealing proximity to the inner edge of the seal plate 10 and the inner edge of the second seal plate 12 extends inwardly into sealing proximity to the outer surface of the sleeve 17. The sleeve at its outer end has a flinger plate or flange part which may include a generally radially outwardly extending portion 18 and a generally radially outwardly and longitudinally inwardly extending flange or plate part 19, the parts 18—19 preferably following substantially the contour of the seal parts 14—15 and the parts of the two seals are slightly spaced apart from each other. The outer edge of the flange part 19 extends substantially to the outer ring.

In operation the inner ring is usually rotated. The seal plate 10 acts as a barrier for the lubricant in the bearing. The channel space 16 in the form shown in Fig. 1 constitutes a chamber which will serve to trap foreign matter which may enter from the outside. The sealing space between the disk 10 and the outer ring and between the sleeve 17 and the disk 10 will ordinarily be sealed by lubricant and prevent the ingress of foreign matter. During rotation of the inner ring the seal member carried thereby will tend to fling off any foreign matter coming into engagement with or into proximity to that flinger seal member. Foreign matter which may enter the space between the adjacent seal plates carried by the inner and outer rings will tend to work outwardly due to the centrifugal action of the rotating seal plate and thus dust and other foreign matter will be effectively prevented from reaching the bearing and in fact will be thrown out and away from the bearing. Foreign matter which does pass inwardly through the long labyrinth passage between the two seal plates will tend to lodge in the chamber or channel 16.

In the form shown in Fig. 2 the parts as heretofore described are preferably employed and have been given the same refeernce characters. In the form shown in Fig. 2, however, I provide a seal ring 20 of yielding character, such as felt, which is carried in the channel and engages the sleeve 17. Preferably the seal ring 20 is carried by the channel and rubs on the sleeve 20 during rotation of the inner ring. Thus an additional seal is provided which very effectively prevents loss of lubricant and ingress of foreign matter.

It will be seen that my improved seal is of simple construction, easily applied, and exceedingly effective for the purposes for which designed.

While the invention has been described in considerable detail and preferred forms illustrated, it is to be understood that various changes may be made within the scope of the invention as defined in the appended claims.

I claim:

1. The combination with a pair of rings disposed one within the other and held in radially spaced apart relationship and against substantial relative movement in an axial direction, the outer of said rings having a counterbore, of a sheet metal sealing disk extending across the space between the rings and seated at its outer portion on the bottom of said counterbore, a second sheet metal sealing disk extending across the space between the rings and abutting said outer portion of said first mentioned sealing disk, said second sealing disk having a generally longitudinally outwardly and radially inwardly extending portion spaced from the other sealing disk and forming therewith a channel opening toward the outer surface of said inner ring, a third seal member, including a sheet metal sleeve rigidly secured on the outer surface of said inner ring and extending axially inwardly beneath the inner edge of said second sealing disk and substantially completely across said channel, said sheet metal sleeve at its axially outer end having an integral flinger flange substantially following the contour of said second sealing disk and located at the outside thereof and lying in sealing proximity to said second sealing disk, said flinger flange terminating at its outer edge radially short of and adjacent said counterbore.

2. In the combination defined in claim 1, a resilient seal ring in said channel and engageable with the outer surface of said sleeve extending across said channel, for the purpose described.

3. The combination with a pair of rings disposed one within the other, of a retainer projecting inwardly from the outer ring into spaced relaton from the inner ring, a sealing ring projecting inwardly from the outer ring along an inclined path into spaced relation from the inner ring and from the retainer, and a flinger having a base portion pressed on the inner ring and extending beyond the inner edge of the sealing ring together with a flange portion disposed outwardly from the sealing ring and sloping in the same general direction as the sealing ring in closely spaced relation therefrom.

4. In the combination defined in claim 3, and a resilient seal ring disposed in the space between said retainer and first mentioned sealing ring and base portion of said flinger.

STANLEY M. COOPER.

REFERENCES CITED

The following references are of record in the file of this patent:

UNITED STATES PATENTS

| Number | Name | Date |
|---|---|---|
| 1,918,988 | Searles | July 18, 1933 |
| 1,946,431 | Vile | Feb. 6, 1934 |
| 2,101,013 | Leister | Nov. 30, 1937 |
| 1,533,184 | Gurney | Apr. 14, 1925 |
| 1,856,547 | Gotthardt | May 3, 1932 |
| 1,437,833 | Buckwalter | Dec. 5, 1922 |
| 1,722,483 | Bott | July 30, 1929 |
| 2,144,691 | Schmal | Jan. 26, 1930 |
| 2,054,581 | Delaval-Crow | Sept. 15, 1936 |
| 1,708,710 | Vincent | Apr. 9, 1929 |

FOREIGN PATENTS

| Number | Country | Date |
|---|---|---|
| 569,065 | French | Apr. 7, 1924 |